Jan. 24, 1967 G. A. COLLINS, JR 3,300,331
COMPOSITE METAL-CERAMIC ARTICLE AND METHOD FOR MAKING SAME
Filed Oct. 7, 1963

INVENTOR.
Glenn R. Collins, Jr.
BY
Barnard, McGlynn & Reising
ATTORNEYS 3,300,331
COMPOSITE METAL-CERAMIC ARTICLE AND
METHOD FOR MAKING SAME
Glenn A. Collins, Jr., North Wales, Pa., assignor to Teleflex Incorporated, North Wales, Pa., a corporation of Delaware
Filed Oct. 7, 1963, Ser. No. 314,477
4 Claims. (Cl. 117—99)

This invention relates to an improved article, and method for making same, comprising a composite of metal and inorganic ceramic material, the metal being present in cellular form to provide a continuous phase affording high strength characteristics and the inorganic ceramic material forming a covering over the metal whereby the composite has extremely high heat and corrosion resistance as well as other desirable characteristics.

At the present state of the mechanical arts, there are many requirements for a structural material having the combination of high mechanical strength, high heat resistance and high corrosion resistance. Frequently light weight is also a requirement or at least an advantageous characteristic. A typical example is a turbine bucket for jet engines and there are numerous others, particularly in space missile technology. Various metals and metal alloys are of course available which provide the necessary mechanical strength characteristics; however, none of these metals or alloys, and certainly none which are available in sufficient quantities to be practical, provide the high heat resistance and the high heat corrosion resistance required. On the other hand, ceramics such as alumina or beryllia meet the parameters for high heat and high corrosion resistance, but they are grossly deficient in mechanical strength. Numerous so-called cermets have been proposed which marry ceramic with metal to attain a composite of their physical characteristics but these cermets inherently rely entirely on the bond strength between the metal and the ceramic for their mechanical strength. The same is true as regards composites wherein a solid formed metal article is provided with an exterior coating of ceramic. With the present invention, certain ceramic or cermet-like materials are married with metals in such a way that the mechanical strength of the finished article is greater than that derived solely by way of the bonding between the ceramic or cermet material and the metal, the metal itself forming a continuous phase network which has extremely high physical strength and which is mechanically interlocked with and bonded to the ceramic or cermet phase.

In United States patent applications Serial Nos. 291,269, now abandoned, 291,271, now Patent No. 3,248,-251, 291,248, 291,246, 291,268, now Patent No. 3,248,-249, and 291,270, now Patent No. 3,248,250, all filed June 28, 1963, and assigned to the assignee of the present invention, there are disclosed and claimed improved coating and bonding compositions which have extremely high heat and corrosion resistance as well as other desirable characteristics and which have in common that they comprise an aqueous solution containing phosphate ion, chromate or dichromate ion and metal ion in substantial amounts, and with a solid particulate material admixed with such aqueous solution to form a slurry. I have now discovered that if open celled metal sponge is impregnated and coated with such slurry and then dried and heated to cure the slurry to water insolubility there results a composite article having an outstandingly superior combination of desirable physical characteristics including high strength, particularly by reason of the continuous metal phase inherent to the metal sponge structure, and high heat and corrosion resistance contributed by the coating material. Since the metal sponge can be formed and is readily available on the market in substantially any shape desired; there are little if any limitations on the shape of the finished articles that can be produced. If desired, the finished article can be left porous, or the metal sponge can be substantially completely filled with the coating material such that a solid substantially non-porous article results. The choice of porosity and hence the amount of coating material applied will, of course, depend upon the use to be made of the article. In either case, the combination of the continuous high strength metal phase contributed by the starting metal sponge structure and the ceramic or cermet-like phase contributed by the coating material provides an article having a remarkable and in fact unique combination of desirable physical properties not heretofore obtainable.

These and other features and advantages of the invention will appear more fully from the following detailed description of various preferred embodiments thereof made in part with reference to the accompanying drawings in which.

Figure 1:
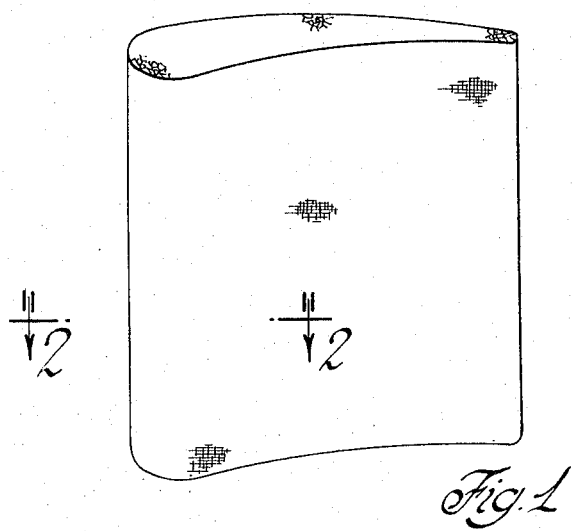
FIGURE 1 is a perspective view of a porous article made in accordance with the invention.

A required starting material for the practice of the invention is an open celled rigid metal sponge preferably formed to the shape desired of the finished composite article. Such metal sponge is well-known and is readily available on the market for example, from the Metallurgical Products Department, General Electric Company, Detroit, Michigan. The sponge can be of any of a variety of cell sizes and of any of a variety of metals, for example, tungsten, nickel, iron, copper, aluminum, molybdenum or alloys such as steel or the high temperature resistance alloys such as are used for turbine buckets.

The other required starting material for the practice of the invention comprises a slurry coating material as disclosed in the aforementioned United States patent applications. As will be illustrated by the examples which follow, the aqueous solution phase of such slurry should preferably contain from about 1 to 4 mols per liter phosphate ion, about .3 to 3 mols per liter chromate ion and about .3 to 4 mols per liter metal ion, most desirably a metal having a valence of $+2$ or $+3$ magnesium being outstanding. By the term "phosphate ion" is meant not only $PO_4^{---}$ ion but also the $HPO_4^{--}$ and $H_2PO_4^{-}$ ions all of which may be and generally will be present in the solution. Also, the term "chromate" is intended to comprehend not only the $CrO_4^{--}$ ion but also the $Cr_2O_7^{--}$ ion both of which are generally present in equilibrium, the precise amounts of each depending upon the particular solution, though for purposes of defining the total present the aforesaid range specified for the chromate ion is on the basis or assumption that of all the chromium-containing anion is present as $CrO_4^{--}$. It will be manifest that the ion concentrations herein set forth include all of the dissolved material to which reference is made, whether existing in associated or disassociated form.

The phosphate ion can be added as phosphoric acid, the ortho acid being preferred, or it can be added as the phosphate of the metal desired to be included as the metal cation, or it can be added in both forms. Where the solution is acidic by reason of the other ingredients added, it is not essential that the metal phosphate, if one is used, be highly water soluble since many of the metal phosphates of low solubility in water are nevertheless soluble in acid. The chromate ion can be added as chromic acid or as a metal chromate or dichromate or as both.

Where some or all of the phosphate or chromate is added in the form of a metal salt, this of course inherently supplies metal cation to the solution. Metal cation can also be supplied by the addition of a metal oxide, hydroxide, carbonate, or the like which will dissolve in acid by way of an acid-base reaction. Of course, where the metal is so added, the other solution ingredients must supply the required acidity to dissolve such additive.

By way of immediate example, a typical solution would be 80 cc. water having dissolved therein 20 ml. $H_3PO_4$ (85%), 15 grams $MgCr_2O_7 \cdot 6H_2O$, 5 grams MgO and 5 grams $Mg(H_2PO_4)_2 \cdot 3H_2O$.

To form the slurry for the practice of the invention, a solid particulate material is uniformly mixed with the aforedescribed solution. The solid particulate material can be any of a variety of metal powders, aluminum powder in spherical form being outstandingly advantageous, or it can be a powdered refractory oxide such as alumina, silica or zirconia, or it can be a refractory nitride, carbide, boride or silicide, examples of the latter being silicon carbide, silicon nitride, boron nitride, silicon boride, and molybdenum disilicite. Other powdered materials, substantially insoluble in the aqueous solution can also be used, the precise choice of such material depending upon the particular characteristics desired of the finished article. Mixtures of powdered materials can of course be used to obtain composite properties. The grain size of the powdered material should preferably be less than 325 mesh.

Where a porous final structure is desired, the powdered material should be included in an amount of from about 300 to 2000 grams per liter of the aqueous solution, the precise amount depending upon the weight per unit volume of the powdered material being used and the consistency desired. In general, from about 500 to 1000 grams per liter is preferable. Where a substantially nonporous solid final structure is desired, the amount of particulate or powdered material included can be increased as covered in the aforementioned United States patent application Serial No. 291,246, to provide an extremely thick-paste-like slurry or mixture of the aqueous solution and the powdered material which can be pressed into the interstices of the metal sponge. Compositions containing as little as 5% by weight of the aqueous solution and the remainder powdered material will sometimes be useful for specialized applications wherein a metal sponge of large cell size and hence very high porosity is used. Alternatively, a solid substantially non-porous finished article can be made in accordance with the invention, by applying a number of successive coats of slurry containing lesser amounts of the particulate material, say 800 grams per liter.

If desired, an aqueous Teflon (polytetrafluoroethylene) dispersion can be included in the coating composition as covered in the aforementioned United States patent application Serial No. 291,248.

After the metal sponge is thoroughly coated or impregnated with the coating composition, it must be dried and then heated to thoroughly cure the coating to complete water insolubility. A complete cure is evidenced by the lack of any chromate or dichromate yellow-orange color when the article is contacted by water. For the non-Teflon-containing coatings the preferred curing temperature is from about 600° to 1000° F. for a period of from about 5 to 60 minutes, depending upon the size of the article. Where Teflon is included, the preferred curing temperature is 800° F. for from about 3 to 5 minutes. In general, the higher the temperature used, the shorter the time required for curing. For a large article, an extended curing period is desirable to assure that the innermost portions are exposed for at least a few minutes to a temperature at least about 600° F. If manufacturing efficiency requires that a lower curing temperature be used, the coating composition covered in the aforementioned United States patent applications Serial Nos. 291,268, now Patent No. 3,248,249, and 291,270, now Patent No. 3,248,250, will serve to advantage, such compositions containing colloidal material such as colloidal silica or colloidal alumina or an alkaline metal silicate such as sodium silicate, and curing at temperatures as low as 300° F.

The following specific examples of coating and impregnating compositions for the practice of the invention will further illustrate.

*Example 1*

| | Grams |
|---|---|
| $CrO_3$ | 92 |
| $H_3PO_4$ | 323 |
| MgO | 72 |
| $H_2O$ to 1000 cc. | |
| Alumina powder (325 mesh) | 800 |

*Example 2*

| | Grams |
|---|---|
| $MgCr_2O_7 \cdot 6H_2O$ | 348 |
| $H_3PO_4$ | 98 |
| $Mg(H_2PO_4)_2 \cdot 3H_2O$ | 272 |
| $H_2O$ to 1000 cc. | |
| Aluminum powder (5–10 microns) | 700 |

*Example 3*

| | Grams |
|---|---|
| $MgCr_2O_7 \cdot 6H_2O$ | 174 |
| $Na_2Cr_2O_7 \cdot 2H_2O$ | 75 |
| MgO | 40 |
| $H_3PO_4$ | 196 |
| $H_2O$ to 1000 cc. | |
| Silica (325 mesh) | 800 |

Figure 2:
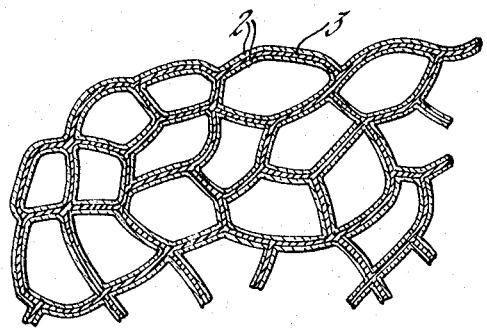
FIGURE 2 is a sectional view in enlarged scale of a portion of the embodiment shown in FIGURE 1.

A tungsten metal open celled sponge having an average cell size of approximately 1/8" diameter was thoroughly cleaned and then immersed in the coating composition set forth in Example 1, the coating composition being thoroughly agitated just prior to immersion to insure complete uniformity of the powdered material in the aqueous solution. The tungsten sponge was moved to and fro in the coating composition to assure complete penetration to the interior portion thereof, removed from the coating bath, spun to cause drainage of excess coating composition, thoroughly dried for about 1 hour at 200° F. and then heated to 625° F. for 30 minutes to cure the coating. The finished article with the cured coating on all of the cell surfaces thereof, had extremely high temperature resistance and extremely high oxidation resistance in oxidizing atmospheres at temperatures upwards of 2500° F. Such article is shown in FIGURES 1 and 2 of the accompanying drawings. As can be seen in FIGURE 2, which is a section of the FIGURE 1 article in enlarged scale, the cured coating forms a continuous protective layer 2 over the surfaces of the metal sponge cells 3.

Figure 3:
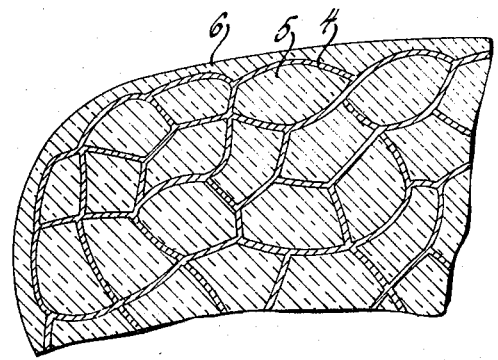
FIGURE 3 is a fragmentary sectional view of another embodiment of the invention.

To completely fill the sponge with the coating material to thereby attain a substantially nonporous structure, the aforedescribed coating steps can be repeated a number of times, each successive coating diminishing the porosity. Preferably the sponge article should be outgassed in a vacuum prior to coating at least for the last few coating steps. That is, the sponge article is suitably supported in a chamber, the chamber evacuated and then the coating solution admitted to the chamber whereby it thoroughly impregnates the sponge. As alluded to previously, greater amounts of the particulate material can advantageously be included in the coating composition to form a non-porous article. After the metal sponge is impregnated to substantial nonporosity with the slurry material, it can be given a surface coating of the slurry which, upon curing, provides a smooth nonporous surface of high heat, corrosion and abrasion resistance. FIGURE 3 shows such an article, 4 being the metal cell walls, 5 the cured impregnant and 6 the cured outer surface coating. Of course, different filler materials can be used in the impregnant and in the coating if desired to provide the precise combination of properties best suited to the particular end use of the article.

It will be understood that while the invention is described specifically with reference to certain preferred embodiments thereof, various changes and modifications may be made all within the full and intended scope of the claims which follow.

I claim:
1. An article of manufacture comprising an open metal sponge having its cell walls covered with a material formed by applying to said sponge a mixture of inorganic solid particulate material having a grain size less than 325 mesh in an aqueous solution, the solute of said solution consisting essentially of a combination of inorganic compounds from the group consisting of phosphoric acid, chromic acid, and the metal salts of said acids, the combination of compounds in said solution being such as will provide at least 1 mol per liter dissolved phosphate, at least .3 mol per liter dissolved material from the group consisting of chromate and molybdate, and at least .3 mol per liter dissolved metal, said solid particulate material being substantially insoluble in said solution and being present in an amount of at least 300 grams per liter of said solution and then drying and heat curing said mixture to water insolubility.

2. An article of manufacture as set forth in claim 1 wherein said sponge is substantially filled with said material whereby said article is substantially nonporous.

3. An article of manufacture as set forth in claim 1 wherein said cell walls are covered with a thin coating of said material whereby said article is porous.

4. An article of manufacture comprising an open metal sponge having its cell walls covered with a material formed by applying to said sponge a mixture of inorganic solid particulate material having a grain size less than 325 mesh in an aqueous solution, the solute of said solution consisting essentially of a combination of inorganic compounds from the group consisting phosphoric acid, chromic acid, and the metal salts of said acids, the combination of compounds in said solution being such as will provide from about 1 to 4 mols per liter dissolved phosphate, from about .3 to 3 mols per liter dissolved material from the group consisting of chromate and molybdate, and from about .3 to 4 mols per liter dissolved metal, said solid particulate material being substantially insoluble in said solution and being present in an amount of at least 300 grams per liter of said solution, and then drying and heat curing said mixture to water insolubility.

References Cited by the Examiner
UNITED STATES PATENTS

| | | | |
|---|---|---|---|
| 1,947,122 | 2/1934 | Burdick et al. | 106—14 |
| 2,357,269 | 8/1944 | Russell et al. | 106—14 |
| 3,207,611 | 9/1965 | Ehren | 106—14 |

RALPH S. KENDALL, *Primary Examiner.*

ALFRED LEVITT, *Examiner.*

A. H. ROSENSTEIN, *Assistant Examiner.*